April 23, 1968   V. C. GAMBRELL ET AL   3,379,829
FLAW DETECTION APPARATUS
Original Filed April 14, 1964   7 Sheets-Sheet 6
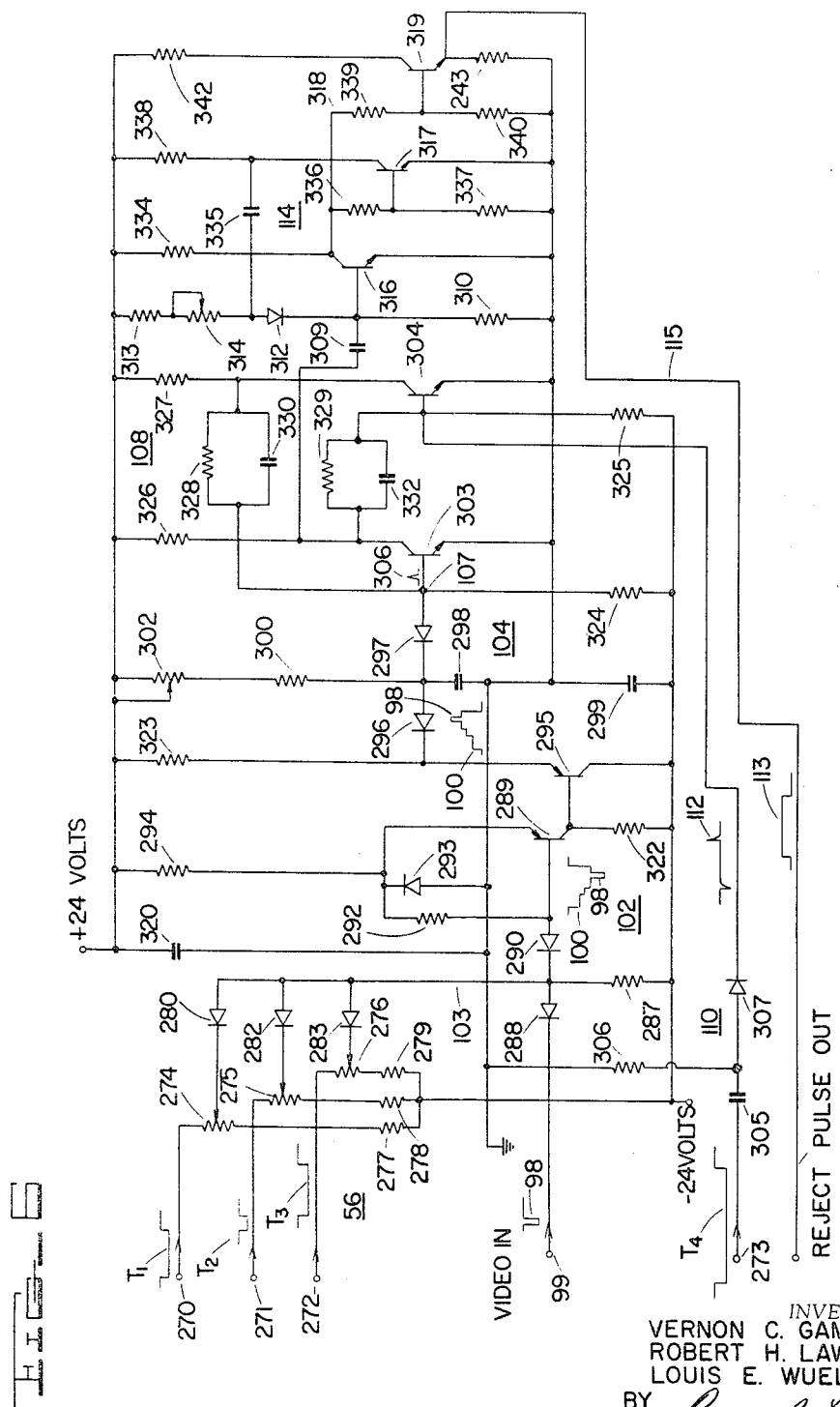
INVENTORS.
VERNON C. GAMBRELL
ROBERT H. LAWBURGH
LOUIS E. WUELLNER
BY
ATTORNEY

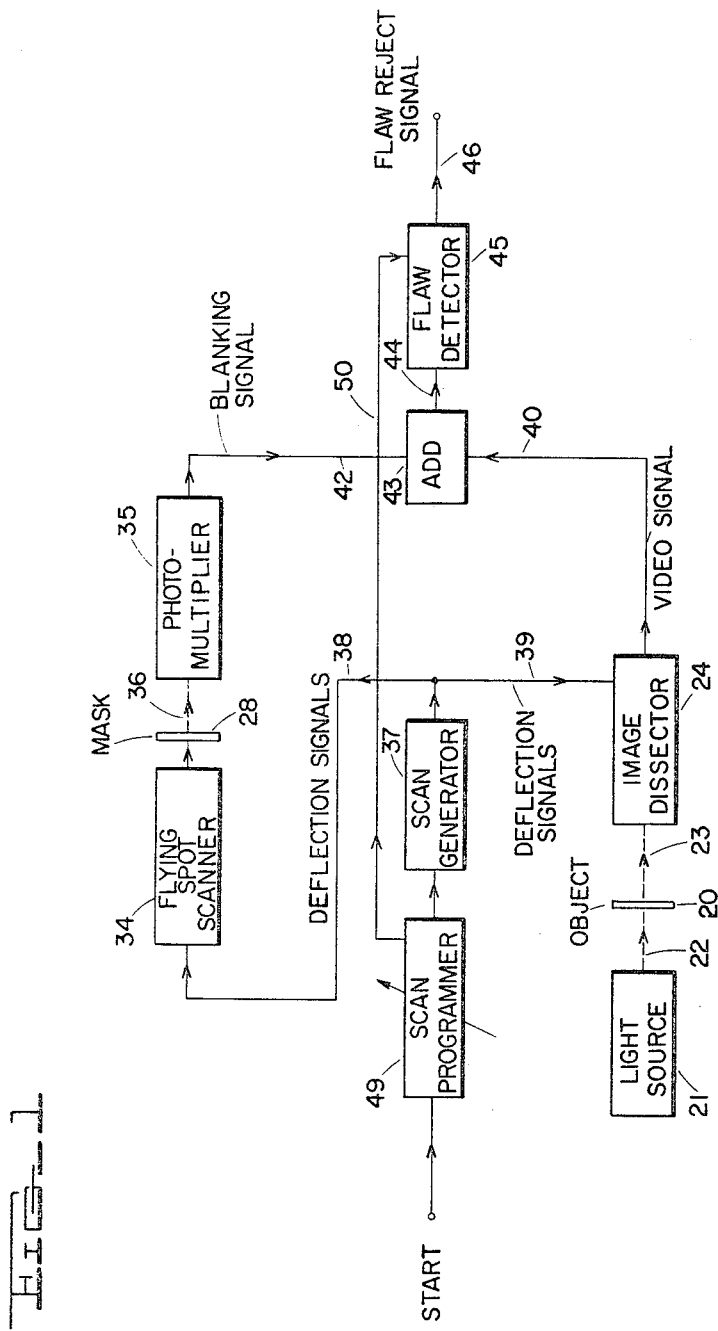

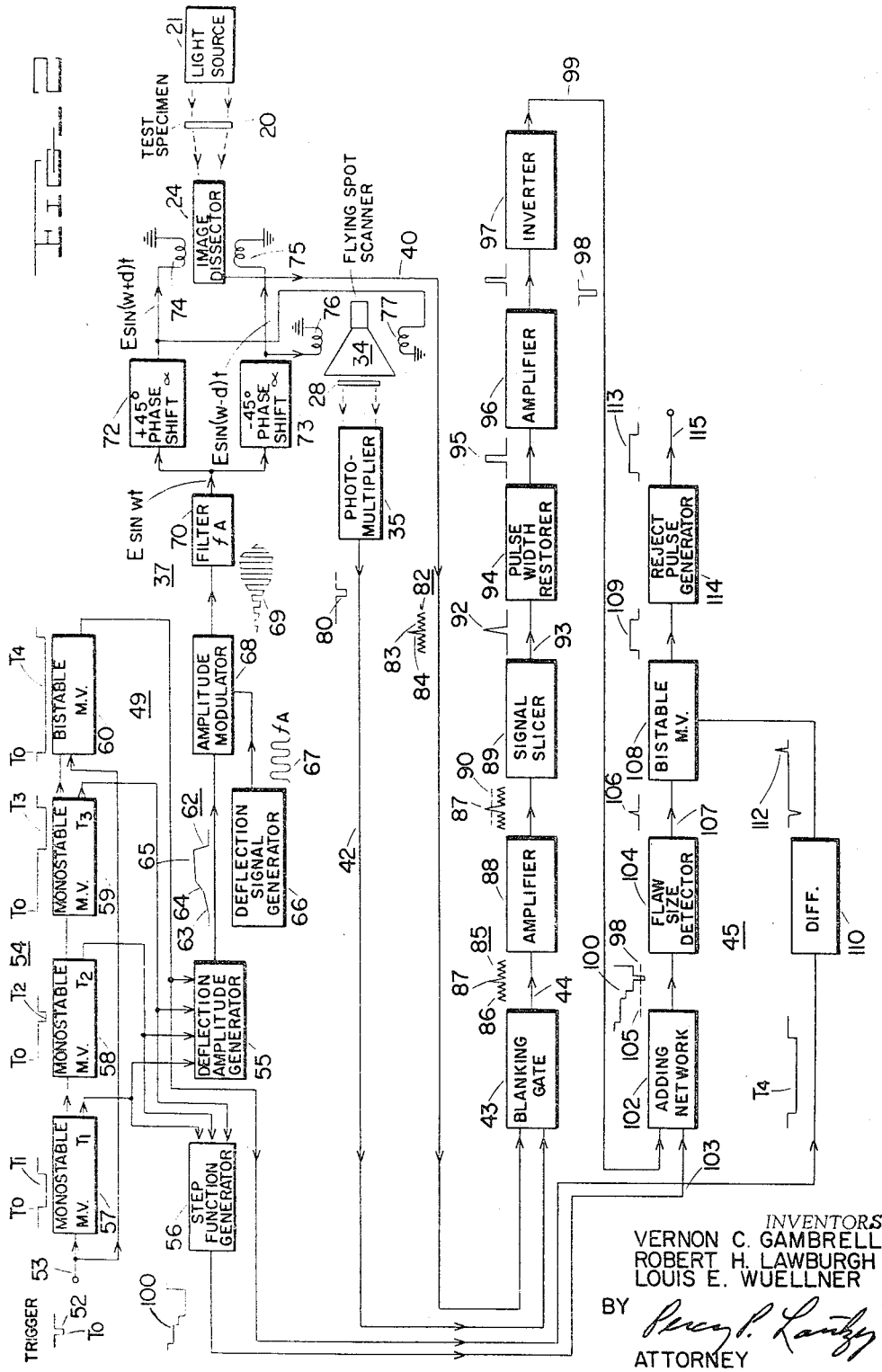

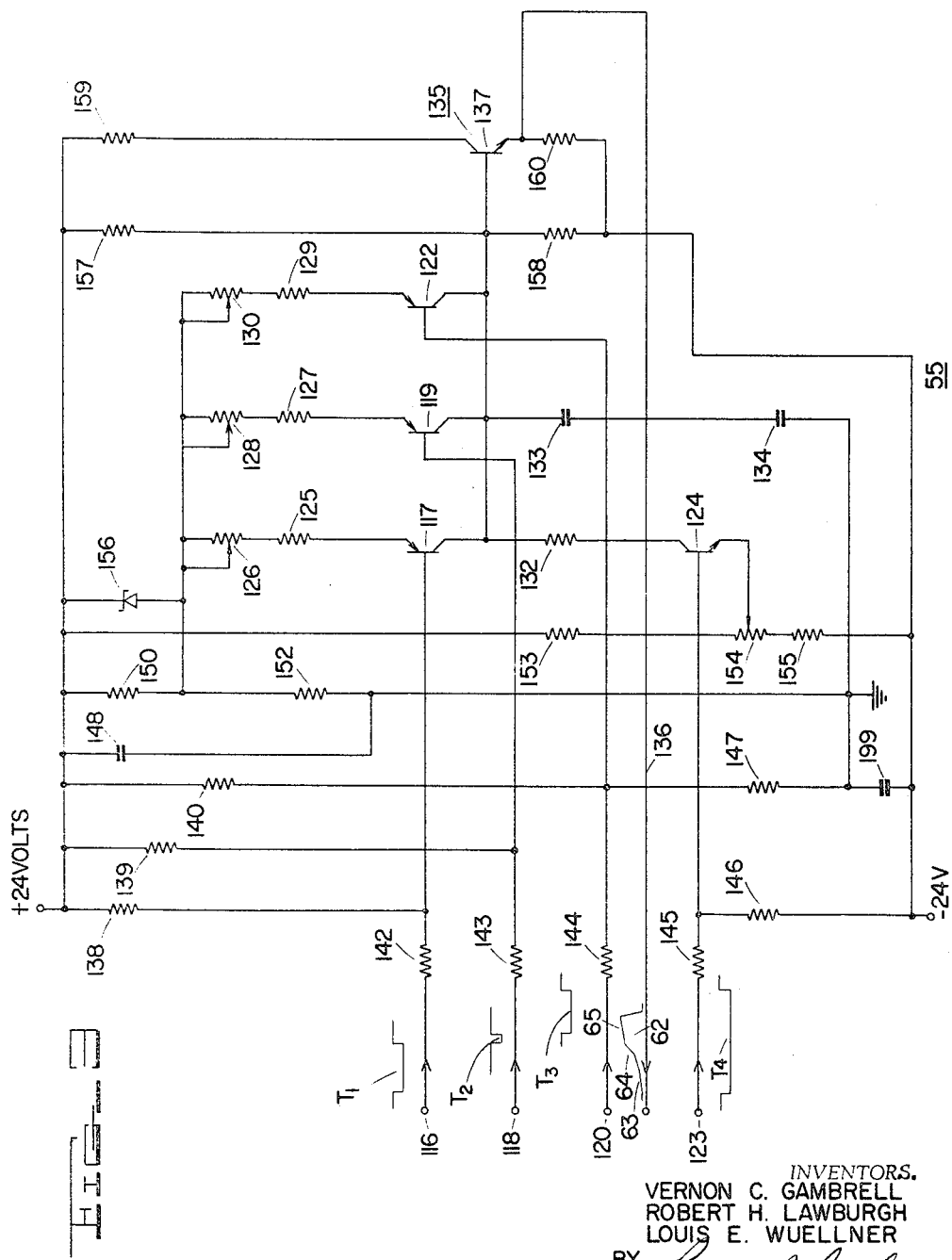

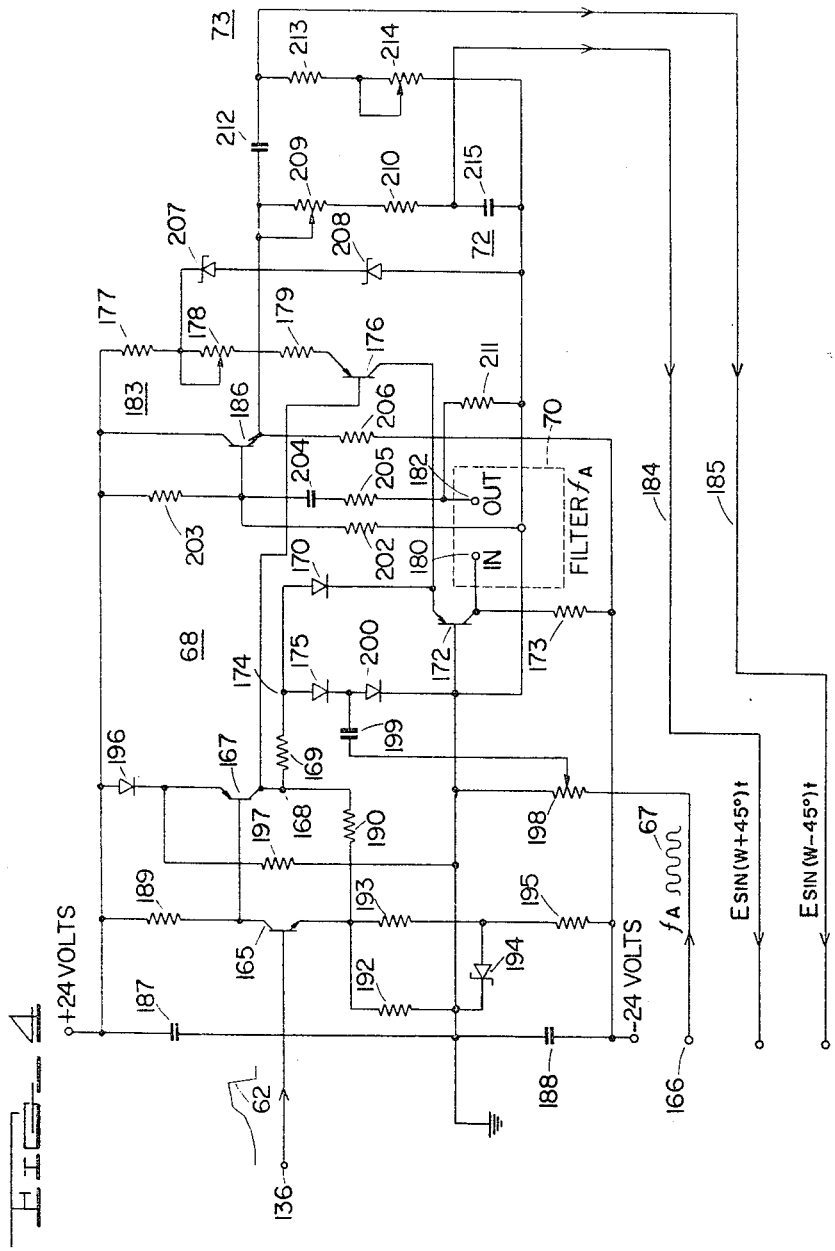

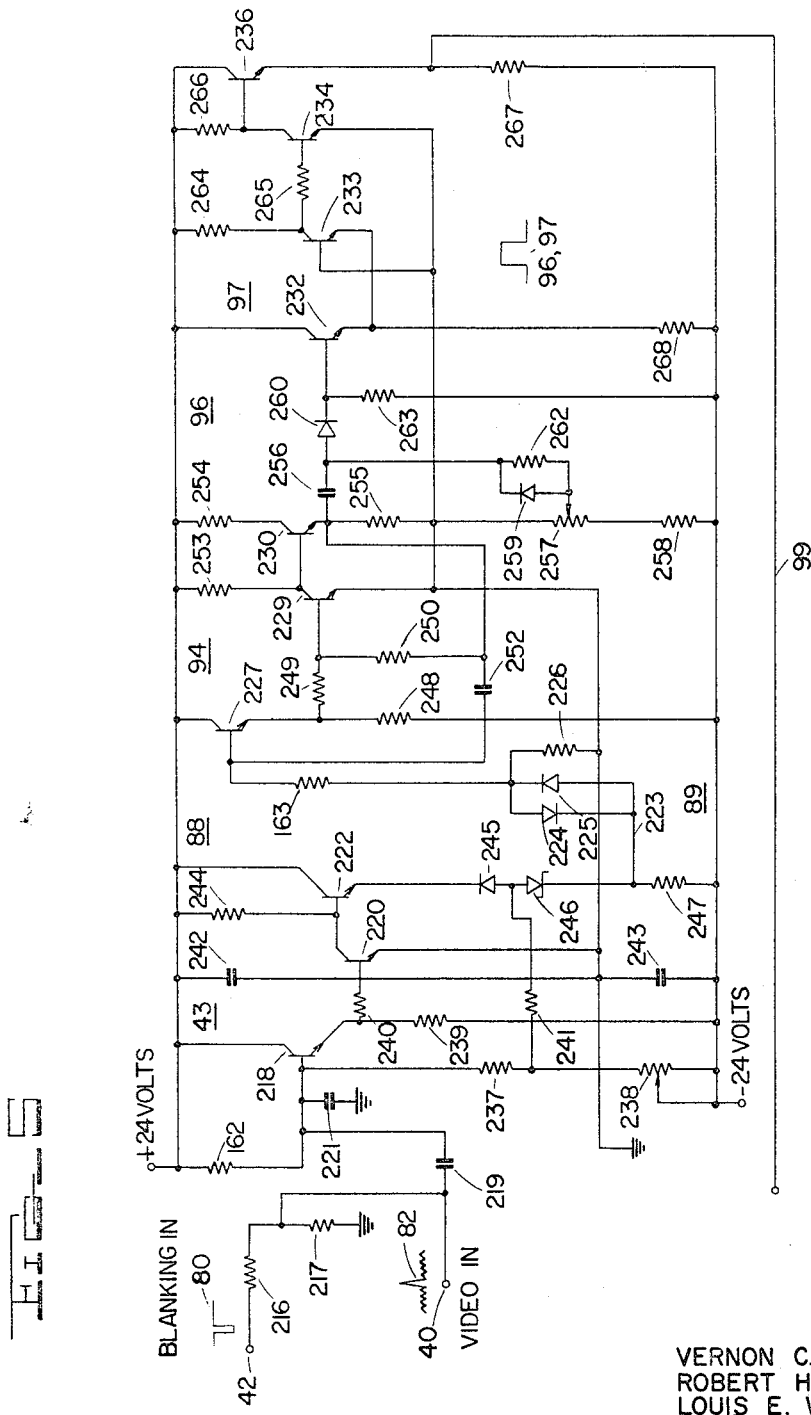

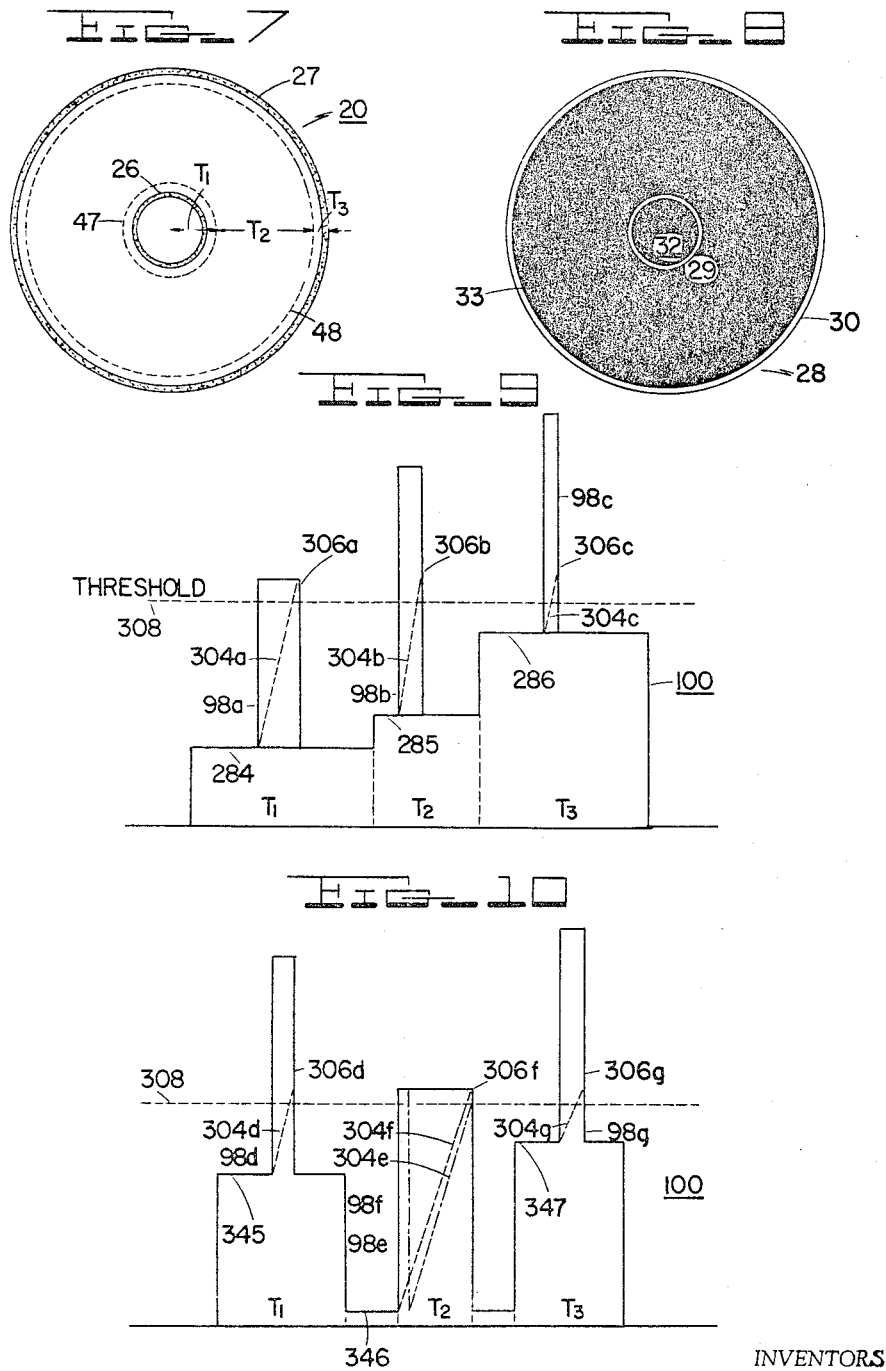

United States Patent Office 3,379,829
Patented Apr. 23, 1968

3,379,829
FLAW DETECTION APPARATUS
Vernon C. Gambrell, Columbia City, and Robert H. Lawburgh and Louis E. Wuellner, Fort Wayne, Ind., assignors to International Telephone and Telegraph Corporation, Nutley, N.J., a corporation of Maryland
Continuation of application Ser. No. 359,722, Apr. 14, 1964. This application Dec. 11, 1964, Ser. No. 417,545
19 Claims. (Cl. 178—6.8)

This is a continuation of patent application Ser. No. 359,722 filed Apr. 14, 1964, now abandoned.

This invention relates generally to flaw detection apparatus, and more particularly to apparatus for detecting foreign particles, cracks, processing defects, and the like in translucent, and transparent objects, such as glassware.

In the manufacture of glass articles, particularly production molded articles such as bottles, dishware and the like, it is necessary to inspect the completed article to detect the presence of foreign particles such as grains of sand, cracks, processing defects, and the like. In the past, time consuming and thus costly visual inspection has been required to detect such flaws. It has therefore been considered desirable to provide flaw detection apparatus for eliminating the requirement for visual inspection and various forms of such apparatus have been proposed and used. However, certain forms of glassware have areas thereon such as surface ornamentation and intentional configurational irregularities which would be detected as defects in conventional flaw detection apparatus. Furthermore, in certain types of glassware, there are areas of varying interest or tolerance, i.e., it may be desirable to detect more minute defects in one area of the article than in another. It is therefore desirable to provide improved flaw detection apparatus capable of detecting flaws in the areas of interest and to the exclusion of other areas, and further capable of selective detection of flaws of different sizes in different predetermined areas of the object being inspected. It is also desirable that such apparatus provide virtually instantaneous inspection and be capable of integration with other production apparatus.

It is accordingly an object of the invention to provide improved flaw detection apparatus.

Another object of the invention is to provide improved flaw detection apparatus capable of detecting flaws in areas of interest to the exclusion of other areas on the object being inspected.

A further object of the invention is to provide improved flaw detection apparatus capable of detecting flaws of different size in different predetermined areas of the object being inspected.

The apparatus in its broader aspects comprises first means for illuminating the object being inspected and including first deflection means for providing a time-based video signal in response thereto. A mask is provided having contrasting areas thereon corresponding to the object which will provide wanted and unwanted video signals, respectively, and second means are provided for illuminating the mask and including second deflection means for providing a time-based blanking signal in response to the areas corresponding to the unwanted video signals. Scan generating means is provided coupled to both of the deflection means for simultaneously applying indentical deflection signals thereto and means are provided for blanking the video signals in response to the blanking signals thereby to provide output video signals responsive to the wanted video signals only. In a preferred embodiment of the invention, programming means are provided coupled to the scan generating means for providing different predetermined scanning rates for different predetermined areas of the object and the mask, and means are provided for detecting output video signals to provide flaw-indicating signals, the detecting means also being coupled to the programming means to provide different predetermined threshold levels for the output video signals for different predetermined areas of the object being inspected, thereby permitting detection of flaws of different sizes.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a simplified block diagram of the system of the invention;

FIG. 2 is a block diagram showing the system of the invention in greater detail;

FIG. 3 is a schematic diagram showing the deflection signal generator of the system of FIG. 2;

FIG. 4 is a schematic diagram showing the modulator, filter, and phase shifting networks of the system of FIG. 2;

FIG. 5 is a schematic diagram showing the video signal processing circuits of the system of FIG. 2;

FIG. 6 is a schematic diagram showing the flaw discrimination circuits of the system of FIG. 2;

FIG. 7 is a diagram showing areas of interest on a typical article of glassware capable of inspection by the system of the invention;

FIG. 8 is a diagram of the mask employed in conjunction with the article of FIG. 7;

FIG. 9 is a diagram useful in explaining the operation of the system of the invention in detecting flaws of equal size in different areas of the object; and FIG. 10 is a diagram similar to FIG. 9 but showing the detection of flaws of different size in different areas of the object.

Referring now to FIG. 1 of the drawing, if the object 20 to be inspected for flaws is transparent or translucent, a suitable source 21 of light is disposed to direct light through the object 20, as indicated by the dashed line 22, the resultant optical image of the object 20, indicated by the dashed line 23, being viewed by a suitable camera tube 24; in the preferred embodiment of the invention, a camera tube of the image dissector type is employed so that one scan of the object 20 will instantaneously provide a time-based output video signal. It will be readily understood that an object 20 of uniform transparency or translucency will provide a uniform level output video signal whereas the presence of opaque foreign particles, cracks or other irregularities in the object 20 will provide detectable video signals of different level in response thereto.

Referring briefly to FIG. 7, the object 20 being inspected may, for example, be a transparent glass dish having surface ornamentation thereon in the form of an etched ring 26 close to the center and another etched ring 27 at the outer periphery. Thus, when the dish 20 is immersed in the light from the source 21 and the image thereof scanned by the camera tube 24, the etched rings 26, 27 will provide corresponding video signals, which, however, are not defects. Thus, the areas of the etched rings 26, 27 are not areas of interest for inspection, whereas the areas of dish 20 within ring 26 and between ring 26 and the ring 27 are areas of interest in which it is desired to detect flaws of the type referred to above.

In order to eliminate the areas of the etched rings 26, 27 from inspection so that only the remaining areas of dish 20 are inspected for flaws, a mask 28 shown in FIGURE 8 is provided having transparent rings 29, 30 corresponding respectively to the etched rings 26, 27 on the dish 20, and having opaque areas 32, 33 respectively corresponding to the areas of interest on the dish 20 within ring 26 and between rings 26, 27.

Referring back to FIG. 1, a flying spot scanning tube 34 is provided arranged to scan a spot of light over the mask 28 and a photosensitive detector device 35, such as a photomultiplier tube, is arranged to receive the light which passes through mask 28 from the flying spot scanner 34, as shown by the dashed line 36, and to provide a time-based blanking signal in response thereto. It will be readily understood that a blanking signal will be provided by the photomultiplier 35 when the spot of light provided by the flying spot scanner 34 is scanned over the transparent areas 29, 30 of the mask 28.

A scan generator 37 is provided for generating appropriate deflection signals, the scan generator 37 being coupled to both the deflection elements of both the image dissector 24 and the flying spot scanner 34, as at 38, 39, so that identical deflection signals are simultaneously applied to both the image dissector and the flying spot scanner.

Signals output circuits 40, 42 of the image dissector 24 and the photomultiplier 35 are coupled to an adding circuit or blanking gate 43 so that the blanking signals provided by the photomultiplier 35 blank the video signals provided by the image dissector 24 so that the only video signals appearing in the output circuit 44 of the adding circuit 43 are those responsive to the areas of interest on the dish 20 within the etched ring 26 and between the etched rings 26, 27. Suitable flaw detection circuitry 45, to be hereinafter more fully described, is coupled to the adding circuit 43 for detecting the output video signals which exceed a predetermined threshold level and which thus are indicative of flaws in the areas of interest of the dish 20, flaw detector 45 thus providing a flaw reject signal in its output circuit 46 in response to a flaw of predetermined size in the areas of interest on the dish 20.

Referring again to FIG. 7, it may be desirable minutely to inspect the center area of the dish 20, shown as being within the dashed line 47, for small defects, and likewise minutely to inspect the peripheral area, shown as being outside of the dashed line 48, for small defects, whereas it may be only necessary to detect larger defects in the area between dashed lines 47, 48. To accomplish this, it is desirable to scan slowly in the area of dish 20 within dashed line 47 and slowly in the area outside of dashed line 48, whereas the area between lines 47, 48 can be scanned more rapidly. Thus, selectively adjustable programming circuitry 49 is provided coupled to the scan generator 37 for providing predetermined different scanning rates for the image dissector 24 and the flying spot scanner 34 for different predetermined areas of the dish 20. Programming circuitry 49 is further coupled to the flaw detecting circuitry 45, as at 50, in order to provide different predetermined threshold levels for the output video signals of the adding circuitry 43 for such different predetermined areas of the dish 20. Thus, as will be hereinafter more fully described, if larger flaws can be tolerated in the area of dish 20 between the dashed lines 47, 48 whereas it is desired to detect smaller flaws in the areas within dashed line 47 and outside of dashed line 48, programming circuitry 49 will set lower threshold levels for the flaw detection circuitry 45 during the times that the image dissector 24 is scanning the areas within dashed line 47 and outside of dashed line 48 on the dish 20, and will set a higher threshold level when the area of dish 20 between lines 47, 48 is being scanned.

In the preferred embodiment of the invention intended for detecting flaws in circular glass objects, and in which the areas of different interest are thus circular, scan generator 37 is arranged to provide spiral scanning for the image dissector 24 and flying spot scanner 34, it being understood that other scanning patterns may be employed for objects having different configurations.

Referring now to FIG. 2, an inspection operation is initiated when the specimen 20 is properly positioned between light source 21 and image dissector 24 by applying a trigger pulse 52 to trigger input circuit 53; trigger pulse 52 may be provided by manual actuation of a momentary contact switch coupling input circuit 53 to a suitable source of potential or may be automatically provided by a suitable limit switch when the test specimen 20 is properly positioned.

Scan programmer 49 comprises timing circuitry 54 coupled to deflection amplitude generator 55 and to step function generator 56. In the illustrated embodiment for inspection permissible in the intermediate area, timing three concentric areas of interest with minute inspection desired in the inner and outer areas and less, rigorous inspection permissible in the intermediate area, timing circuitry 54 comprises a chain of three monostable multivibrators 57, 58 and 59 and a bistable multivibrator 60. Monostable multivibrator 57 is coupled to input circuit 53 and is thus triggered by the trigger pulse 52 to provide a first pulse $T_1$ initiated at time $T_0$ coincident with initiation of the trigger pulse 52. Monostable multivibrator 58 is coupled to monostable multivibrator 57 and generates a second pulse $T_2$ initiated coincident with termination of pulse $T_1$. Monostable multivibrator 59 is coupled to monostable multivibrator 58 and generates a third pulse $T_3$ initiated coincident with termination of pulse $T_2$. Thus the monostable multivibrators 57, 58, 59 generate a succession of timing pulses $T_1$, $T_2$, $T_3$ of selectively adjustable duration. Bistable multivibrator 60 is coupled to the input circuit 53 and to monostable multivibrator 59 and generates a pulse $T_4$ initiated at $T_0$ coincident with initiation of the trigger pulse 52 and terminated coincident with termination of the last timing pulse $T_3$.

Monostable multivibrators 57, 58 and 59 and bistable multivibrator 60 are respectively coupled to deflection amplitude generator 55, shown in detail in FIG. 3 and hereinafter more fully described which generates deflection amplitude signal 62 having portions of different slope respectively inversely proportional to the durations of the timing pulses $T_1$, $T_2$ and $T_3$, termination of the timing pulse $T_4$ terminating the generation of the deflection signal. Thus, it is seen that the deflection amplitude signal 62 has a first portion 63 during the occurrence of the first timing pulse $T_1$ and having a slope to provide the desired slow scanning of the center portion of the dish 20 within the dashed line 47, a second portion 64 coincident with the occurrence of the second timing pulse $T_2$ and having a slope to provide the desired fast scanning of the area of the dish 20 between the dashed lines 47, 48 and a portion 65 coincident with the third timing pulse $T_3$ having a slope to provide the desired slower scanning of the peripheral area of dish 20 outside of the dashed line 48. It will be understood that terms "slow" and "fast" scanning refer to the spacing of the scanning lines rather than to the scanning frequency. It will also be readily understood that the respective durations of the timing pulses $T_1$, $T_2$ and $T_3$ may be seletively adjusted to provide the desired scanning rates for the different selected areas of the dish 20, and that a lesser or greater number of monostable multivibrators and thus timing pulses may be provided to correspond to the number of different areas of interest on the test specimen.

Scan generator 37 comprises deflection amplitude generator 55, deflection signal generator 66, modulator 68, filter 70 and phase shift networks 72, 73.

In the illustrated embodiment, deflection signal generator 66 provides a sine wave carrier signal 67 having a frequency $f_A$, deflection signal amplitude generator 55 and the deflection signal generator 66 being respectively coupled to amplitude modulator 68 so as to modulate the deflection amplitude signal 62 onto the sine wave carrier signal 67 to provide the modulated signal 69 in which the deflection amplitude signal 62 forms the modulation envelope for the carrier signal 67. A suitable filter 70 is coupled to the amplitude modulator 68 and is tuned to pass the carrier frequency $f_A$ and to reject other frequenies thus to provide sine wave signal of frequency $f_A$ having its amplitude varied in accordance with deflection amplitude signal 62. Plus 45° and minus 45° phase shift networks 72, 73 are respectively coupled to filter 70 and in turn to the vertical and horizontal deflection yokes 74, 75 of image dissector 24 and 76, 77 of flying spot scanner 34 in order to provide simultaneous spiral scanning for each tube, the diameter of the scanning being in accordance with the deflection amplitude signal 62 provided by the deflection amplitude signal generator 55. It will be readily understood that conventional deflection amplifiers will be provided between the phase shift networks and their respective deflection coils.

The signal output circuit 42 of photomultiplier 35 and the signal output circuit 40 of the image dissector 24 are respectively coupled to blanking gate 43. Thus, a blanking signal 80 from the photomultiplier 35 in response to scanning of one of the transparent rings 29, 30 on the mask 28 is impressed upon the blanking gate 43 along with video signal 82 from the image dissector 24. In the absence of a flaw in the test specimen, video signal 82 will have a normal level 83 with the usual noise superimposed thereon, whereas scanning of an irregularity, either a flaw or the etched rings 26, 27 will provide a pulse 84 in the video signal having a duration responsive to the size of the irregularity. The blanking gate 43 blanks the video signal 82 during the occurrence of blanking signals 80 so that output video signal 85 appears in output circuit 44 of blanking gate 43 only when the image dissector 24 is scanning areas of the dish 20 other than the etched rings 26, 27. Output video signal 85 will thus, in common with the raw video signal 82, have a normal level 86 with noise superimposed thereon and pulses 87 responsive to detection of flaws in the areas of interest on the test specimen.

The output video signal 85 is amplified by a suitable amplifier 88 and a signal slicing circuit 89 is provided to pass only those portions of the pulses 87 having an amplitude above a predetermined level, as shown by the dashed line 90, thus to eliminate the noise and to provide a resultant flaw-indicating signal 92 in its output circuit 93. The original width of the flaw-indicating signal is restored and the pulse is squared in pulse-width restoring circuit 94 and the resultant pulse 95 is amplified by a suitable amplifier 96 and then inverted by an inverting circuit 97 to provide flaw-indicating pulse 98 in its output circuit 99.

In order to detect the flaw-indicating pulses 98 to determine those which exceed predetermined threshold levels for different predetermined areas of interest of the test specimen and thus to provide an indication when a flaw in any one of the areas exceeds permissible size, the monostable multivibrators 57, 58, 59 are respectively coupled to step function generator 56 which generates a step function voltage 100 responsive to the timing pulses $T_1$, $T_2$, $T_3$; in FIG. 2, the timing pulses $T_1$, $T_2$, $T_3$ are shown as respectively providing a stepped-function voltage of successively increasing potential steps (negative-going), however, as will be hereinafter described, other step function voltage configurations may be provided to provide detection of flaws of different predetermined sizes in different areas of interest of the test specimen.

The flaw detection circuitry 45 comprises an adding network 102 coupled to the output circuit 99 of inverter 97 which is the last stage of the video signal processing circuitry and output circuit 103 of the step function generator 56, the adding network 102 thus superimposing the flaw-indicating pulse or pulses 98 on the step function voltage 100 with the step-voltage thus serving as a pedestal for the flaw-indicating pulses 98. Flaw size detector circuit 104 is coupled to the adding network 102 and detects the superimposed flaw-indicating pulses 98 which exceed a predetermined threshold level, as shown by the dashed line 105. Thus, each superimposed flaw-indicating pulse 98 which exceeds threshold level 105 will provide an output signal 106 in output circuit 107 of the flaw-size detector 104. Bistable multivibrator 108 is coupled to output circuit 107 of the flaw size detector 104 and thus the first flaw-indicating output signal 106 which is detected during one inspection operation, i.e., during a timing pulse $T_4$ initiates a pulse 109. Bistable multivibrator 60 is coupled to differentiating circuit 110 which differentiates the timing pulse $T_4$, differentiating circuit 110 being coupled to bistable multivibrator 108 so that the trailing edge differentiated pulse 112 terminates pulse 109.

Since the duration of pulse 109 provided by bistable multivibrator 108 will depend upon the occurrence of the first pulse-indicating signal 106 during an inspection operation and since it may be desirable to provide an output flaw-reject pulse 113 of fixed duration to actuate a suitable flaw alarm or other apparatus for removing a defective object from the production line, reject pulse generator 114 is provided coupled to bistable multivibrator 108 and initiating the fixed length reject pulse 113 in response to the variable-width pulse 109; in the specific embodiment of the invention reject pulse 113 is initiated in response to termination of pulse 109. Reject pulse 113 thus appears in output circuit 115 of reject pulse generator 114 and can be employed as desired to actuate an alarm or other apparatus.

Referring now to a specific embodiment of the invention, FIG. 3 is a schematic diagram of the deflection amplitude generator 55. Here, timing pulse $T_1$ from monostable multivibrator 57 is applied to input circuit 116 and to the base of transistor 117, timing pulse $T_2$ from monostable multivibrator 58 is applied to input circuit 118 and to the base of transistor 119, timing pulse $T_3$ from monostable multivibrator 59 is applied to input circuit 120 and to the base of transistor 122, and timing pulse $T_4$ from bistable multivibrator 60 is applied to input circuit 123 and to the base of transistor 124. Transistor 117 has its emitter serially connected with resistors 125, 126, transistor 119 has its emitter serially connected with resistors 127, 128, and transistor 122 has its emitter serially connected with resistors 129, 130. The collectors of transistors 117, 119 and 122 are connected together and to the collector of transistor 124 by resistor 132. Capacitors 133, 134 are serially connected between the collectors of transistors 117, 119, 122 and ground, as shown. The collectors of transistors 117, 119, 122 are coupled to a conventional emitter follower circuit 135 which in turn is coupled to output circuit 136 in which the deflection amplitude signal 62 appears.

It will be seen that each of the transistors 117, 119, 122 with the resistors respectively connected in its emitter circuit forms with capacitors 133, 134 a saw-toothed generator circuit. Application of the timing pulse $T_4$ to the input circuit 123 and the base of transistor 124 turns transistor 124 off thus enabling the saw-toothed generator circuits of transistors 117, 119 and 122. Application of the first timing pulse $T_1$ to the input circuit 116 and the base of transistor 117 turns transistor 117 on thereby initially charging up capacitors 133, 134 to provide the first portion 63 of the deflection amplitude signal 62. Termination of the first timing pulse $T_1$ turns off transistor 117 and the second timing pulse $T_2$ turns on transistor 119 further to charge up capacitors 133, 134 to provide the second portion 64 of the deflection amplitude signal 62. Finally, termination of timing pulse $T_2$ and occurrence of timing pulse $T_3$ turns off transistor 119 and turns on transistor 122 to complete charging of capacitors 133, 134 to provide the final portion 65 of the deflection amplitude signal 62. Termination of the timing pulse $T_4$ turns on transistor 124 thus to discharge capacitors 133, 134 to terminate deflection amplitude signal 62. It will be understood that the values of resistors 125 and 126, 127 and 128, 129 and 130 respectively forming saw-tooth generating circuits with transistors 117, 119, 122 and the capacitors 133, 134 are chosen to provide the desired slopes for the portions 63, 64 and 65 of the deflection amplitude signal 62.

In an actual circuit in which the durations of timing pulses $T_1$ and $T_3$ were each 420 milliseconds and the duration of timing pulse $T_2$ was 160 milliseconds, i.e., thus providing timing pulse $T_4$ with a duration of one (1) second, the following component values were employed in the circuit of FIG. 3:

| | |
|---|---|
| Transistors 117, 119, 122 | 2N1036 |
| Transistors 124, 137 | 2N697 |
| Resistor 125 | 56K |
| Resistor 126 | 20K |
| Resistor 127 | 10K |
| Resistor 128 | 20K |
| Resistor 129 | 91K |
| Resistor 130 | 50K |
| Resistor 132 ohms | 10 |
| Capacitors 133, 134 mfd | 40 |
| Resistors 138, 139, 140 | 10K |
| Resistor 142 | 4.3K |
| Resistor 143 | 3.9K |
| Resistor 144 | 4.3K |
| Resistor 145 | 5.6K |
| Resistors 146, 147 | 10K |
| Capacitors 148, 149 mfd | .01 |
| Resistors 150, 152 | 2K |
| Resistor 153 | 33K |
| Resistor 154 | 2.5K |
| Resistor 155 | 27K |
| Diode 156 | 1N759 |
| Resistors 157, 158 | 1M |
| Resistor 159 | 18K |
| Resistor 160 | 30K |

Referring now to FIG. 4 in which specific circuitry for the modulator 68 and phase shift networks 72, 73 is shown, the circuit of modulator 68 is similar to that described and illustrated in application Ser. No. 247,186 of Nelson E. Hoag and Jerry L. Holsinger and assigned to the assignee of the present application. Here the deflection amplitude signal 62 appearing on output circuit 136 of the deflection amplitude generating circuit 55 is applied to the base of transistor 165 and the deflection signal 67 from the deflection signal generator 66 is applied to input terminal 166. Transistors 165 and 167 are coupled in a direct current stabilized feedback amplifier circuit with the amplified deflection amplitude signal 62 appearing at the collector 168 of transistor 167. The deflection signal 67 is modulated by the amplified signal 62 by a diode resistor switching network comprising serially connected resistor 169, diode 170, the emitter and collector of transmitter 172 and load resistor 173. The input circuit 166 is connected to the point 174 between resistor 169 and diode 170 by a diode 175. With this circuitry, an output signal appears across load resistor 173 in response to the deflection amplitude signal 62, this output signal being pulsed on or off or chopped at the frequency of the deflection signal 67.

Examination of the circuit will reveal that the signal appearing at the emitter of transistor 172 contains all of the signal components, i.e., the frequency $f_A$, the upper and lower sideband frequencies, and the modulating frequency, i.e., the deflection amplitude signal, at one-half amplitude. It is desired to filter out all frequency components other than the varying deflection signal $f_A$. The modulating frequency component is cancelled by coupling the collector of transistor 167 to the base of transistor 176 which has its collector connected to the emitter of transistor 172 and has its emitter serially connected with resistors 177, 178 and 179. With proper selection of the values of resistors 177, 178 and 179, a signal having half the amplitude of the modulating signal, i.e., deflection amplitude signal 62, and inverted with respect thereto is applied to the emitter of transistor 172 thus resulting in subtraction, i.e., cancellation of the modulating signal component.

Transistor 172 is coupled to input terminal 180 of filter 70 which has its output terminal 182 coupled by means of a conventional emitter follower circuit 183 to the phase shifting networks 72, 73 which in turn are respectively connected to the vertical and horizontal deflection output circuits 184, 185.

In the above-referred specific embodiment of the invention, the following component values were employed in the circuit shown in FIG. 4 in which the deflection signal frequency $f_A$ was 60 cycles:

| | |
|---|---|
| Transistors 165, 186 | 2N696 |
| Transistors 167, 172, 176 | 2N1131 |
| Capacitors 187, 188 mfd | .01 |
| Resistors 189, 190, 169 | 10K |
| Resistor 192 | 8.2K |
| Resistor 193 | 4.7K |
| Diode 194 | 1N751 |
| Resistor 195 | 1.8K |
| Diode 196 | 1N459 |
| Resistor 197 | 27K |
| Resistor 198 | 20K |
| Capacitor 199 mfd | 10 |
| Diode 175 | 1N459 |
| Diode 200 | 1N751 |
| Resistor 173 | 12K |
| Diode 170 | 1N277 |
| Resistor 202 | 22K |
| Resistor 203 | 1.8M |
| Capacitor 204 mfd | .01 |
| Resistor 205 | 5.6K |
| Resistor 206 | 6.8K |
| Resistor 177 | 2.2K |
| Resistor 178 | 50K |
| Resistor 179 | 10K |
| Diodes 207, 208 | 1N751 |
| Resistor 209 | 25K |
| Resistor 210 | 15K |
| Resistor 211 | 15K |
| Capacitor 212 mfd | .1 |
| Resistor 213 | 15K |
| Resistor 214 | 25K |
| Resistor 215 mfd | .1 |

Referring now to FIG. 5, the specific circuitry of the blanking gate 43 and the video processing circuitry, i.e., amplifier 88, signal slicer 89, pulse width restorer 94, amplifier 96, and inverter 97 is shown. Here, the negative-going blanking pulses 80 in output circuit 42 of the photo-multiplier 35 are applied across resistors 216, 217 with the midpoint between these resistors being coupled to the base of gating transistor 218 by coupling capacitor 219, and the positive-going video signal 82 in output circuit 40 of the image dissector 24 is likewise applied to the base of gating transistor 218 by coupling capacitor 219. It will be readily seen that the negative-going blanking pulses 80 turn off transistor 218, however, in the absence of any blanking pulse 80, the positive-going video signals 82 are gated through transistor 218 which is coupled in an emitter-follower configuration to the feedback amplifier 88 comprising transistors 220, 222. The output circuit 223 of the amplifier 88 is coupled to the slicing circuit 89 comprising diodes 224 and 225 and resistor 226, slicing circuit 89 in turn being coupled to the pulse width restoring circuit 94 which takes the form of a Miller integrator and including transistors 227, 229 and 230. The output circuit 228 of the pulse width restorer circuit 94 is coupled to amplifier 96 comprising transistors 229, 230 which in turn is coupled to amplifier and inverter circuit 97 comprising transistors 232, 233, 234 and 236.

In the above-referred to specific embodiment, the following component values were employed in the circuit of FIG. 5:

| | |
|---|---|
| Transistors 218, 220, 222, 227, 229, 230, 232, 233, 234, 236 | 2N697 |
| Resistor 162 | 47K |
| Resistor 163 | 10K |
| Resistor 217 | 10K |
| Capacitor 219 | mfd__ 10 |
| Capacitor 221 | mfd__ .01 |
| Resistor 216 | 4.7K |
| Resistors 237, 239, 240 | 10K |
| Resistor 238 | 25K |
| Resistor 241 | 18K |
| Capacitor 242, 243 | mfd__ .01 |
| Resistor 244 | 10K |
| Diode 245 | 1N751 |
| Diode 246 | 1N465 |
| Resistor 247 | 5.6K |
| Diodes 224, 225 | 1N629 |
| Resistor 226 | 56K |
| Resistor 248 | 10K |
| Resistor 249 | 5.1K |
| Resistor 250 | 51K |
| Capacitor 252 | mfd__ 2000 |
| Resistor 253 | 33K |
| Resistor 254 | ohms__ 560 |
| Resistor 255 | 5.1K |
| Capacitor 256 | mfd__ 10 |
| Resistor 257 | 5K |
| Resistor 258 | 12K |
| Diodes 259, 260 | 1N277 |
| Resistors 262, 263 | 100K |
| Resistors 264, 265, 267 | 10K |
| Resistor 266 | 20K |
| Resistor 268 | 56K |

Referring now to FIG. 6 in which the specific circuitry for the step function generator 56, adding network 102, flaw size detector 104, bistable multivibrator 108 and reject pulse generator 114 is shown, timing pulses $T_1$, $T_2$ and $T_3$ from the monostable multivibrators 57, 58, 59 are respectively applied to input terminals 270, 271 and 272, and timing pulse $T_4$ from the bistable multivibrator 60 is applied to input terminal 273. The step function generator circuit 56 comprises potentiometers 274, 275 and 276 respectively connecting input terminals 270, 271, 272 to resistors 277, 278 and 279. Potentiometers 274, 275 and 276 have their adjustable elements coupled to output circuit 103 by diodes 280, 282 and 283. It will readily be seen that with the diodes 280, 282 and 283 polarized as shown, a stair-step function 100 will be generated as shown in FIG. 2 and as shown in inverted form in FIG. 9, adjustment of the potentiometers 274, 275 and 276 providing the relative amplitudes of the three steps 284, 285 and 286 respectively coextensive with the three timing pulses $T_1$, $T_2$ and $T_3$.

The flaw-indicating pulse 98 in output circuit 99 from inverter 97 and the step-function voltage 100 in the output circuit 103 of the function generator 56 are applied to adding network 102, output circuit 99 being coupled to load resistor 287 by diode 288 and output circuit 103 being directly coupled to load resistor 287, as shown. Output circuit 103 is also coupled to the base of emitter follower transistor 289 by diode 290, resistor 292, diode 293 and resistor 294 serving as a clamping circuit for the thus superimposed flaw-indicating pulses 98 and step function voltage 100 applied to the cathode follower 289.

The negative-going superimposed step-function voltage 100 and flaw-indicating pulses 98 are inverted by transistor 295 and applied to flaw size detector 104 comprising diodes 296 and 297, capacitor 298, resistor 300 and variable resistor 302.

Referring momentarily to FIG. 9, the inverted step-function voltage 100 is shown as applied to the flaw size detector 104 with three flaw-indicating pulses 98a, 98b and 98c superimposed thereon, as shown. In this instance, it is desired to detect flaws of equal size in each of the three areas of interest of the dish 20, the flaws being 10 mils in width in the specific embodiment. Recalling now that scanning of the dish 20 by the image dissector 24 is at a relatively slow rate during timing pulses $T_1$ and $T_3$ and at a relatively faster rate during timing pulse $T_2$, and further that as the spiral scanning moves radially outwardly toward the perimeter of the dish 25, the tangential velocity increases even though the radial velocity remains the same, a 10-mil flaw detected in the area within the circle 47 will produce a flaw-indicating pulse 98a having a duration of 16 microseconds, a 10-mil flaw detected in the area between the two circles 47, 48 will produce a flaw-indicating pulse 98b having a duration of 10-microseconds, and a 10-mil flaw detected in the area outside of circle 48 will provide a flaw-indicating pulse 98c having a duration of 2.2 microseconds, the flaw-indicating pulses 98a, 98b and 98c having the same initial amplitudes in response to flaws of the same character. It will be observed that capacitor 298 and resistors 300, 302 form a saw-tooth voltage generating circuit, the capacitor 298 being charged at a rate depending upon the values of resistors 300, 302 in response to the amplitude and duration of the flaw-indicating pulses 98a, 98b and 98c, as indicated by the dashed lines 304a, 304b and 304c in FIG. 9.

The saw-tooth voltage generator circuit 298, 300, 302 is employed in order to provide a signal amplitude proportional to the durations of the flaw-indicating pulses 98 so that the peaks 306 which exceed a predetermined threshold level 308 can be employed as flaw-indicating output signals. It will be observed, however, that while the flaw-indicating pulses 98a, 98b and 98c have the same amplitude and are respectively responsive to flaws of the same size, their respective durations are progressively shorter for the reasons stated above. Thus, if each of the flaw-indicating pulses 98a, 98b and 98c were positioned on the same base line, it will be seen that the peaks of the saw-tooth voltages 304b and 304c would not exceed the threshold level 308 and thus would not provide the requisite flaw-indicating output signals. Thus, in order to compensate for the reduced durations of flaw-indicating pulses in the outer scanning areas, the flaw-indicating pulses 98 are superimposed upon the step-function voltage 100 so that the peaks 306b and 306c of the saw-tooth voltages 304b and 304c respectively exceed the threshold level 308, as seen in FIG. 9. It will be readily understood that the potentiometers 274, 275 and 276 of the step-function generator 56 permit adjustment of the relative amplitudes of the steps 284, 285 and 286 of the step-function voltage 100 so that the desired flaw size discrimination is provided. It will be understood that the initial step 284 coincident with the timing pulse $T_1$ is provided in order to prevent noise in the video signal from affecting the discrimination circuitry.

The output circuit 107 of the flaw-size detector circuit 104 is coupled to the "set" input circuit of bistable multivibrator 108 comprising transistors 303 and 304. It will be seen that the level at which bistable multivibrator 108 will be "set" to initiate pulse 109 is the threshold level 308 shown in FIG. 9 and therefore that the first peak 306 which exceeds the threshold level 308 occurring during timing pulse $T_4$ will set the bistable multivibrator 108 to initiate the pulse 109; subsequent peaks 306 which exceed threshold level 308 occurring during the same timing pulse $T_4$ will have no affect on the previously set bistable multivibrator 108.

The timing pulse $T_4$ applied to input terminal 273 is differentiated by means of differentiating circuit 110 comprising capacitor 305, resistor 306 and diode 307, differentiating circuit 110 coupled to the "reset" input circuit of the bistable multivibrator 108, i.e., the base of transistor 304. Thus, the positive-going trailing edge differentiated pulse 112 of the timing pulse $T_4$ will "reset" the bistable multivibrator 108 to terminate pulse 109.

The pulse 109 provided by the bistable multivibrator 108 is differentiated by a differentiating circuit comprising capacitor 309, resistor 310, diode 312 and resistors 313 and 314. Output circuit 315 of this differentiating circuit is coupled to the input transistor 316 of monostable multivibrator 114 which also comprises transistor 317. Thus, the negative-going differentiated pulse responsive to the trailing edge of pulse 109 provided by bistable multivibrator 108 "sets" monostable multivibrator 114 which thus provides reject pulse 113 having a fixed duration determined by the values of the timing circuitry of the monostable multivibrator 114. The output circuit 318 of the monostable multivibrator 114 is coupled to reject pulse output circuit 115 by emitter follower transistor 319.

In the above-referred to specific embodiment, the following component values were employed in the circuit of FIG. 6:

| | |
|---|---|
| Resistors 274, 275, 276 | 50K |
| Diodes 280, 282, 283 | 1N277 |
| Resistors 277, 278, 279 | 47K |
| Diodes 288, 290 | 1N277 |
| Resistor 287 | 47K |
| Resistor 306 | 10K |
| Capacitor 305 ____mfd__ | .033 |
| Diode 307 | 1N277 |
| Resistor 292 | 47K |
| Resistor 294 | 3.3K |
| Capacitor 320 ____mfd__ | .01 |
| Transistor 289 | 2N1036 |
| Resistor 322 | 20K |
| Transistor 295 | 2N1036 |
| Diodes 296, 297 | 1N277 |
| Capacitor 298 ____mfd__ | 2,000 |
| Capacitor 299 ____mfd__ | .01 |
| Resistor 300 ____ohms__ | 180 |
| Resistor 302 | 50K |
| Resistor 323 | 20K |
| Transistors 303, 304, 316, 317, 319 | 2N697 |
| Resistors 324, 325 | 560K |
| Resistors 326, 327 | 10K |
| Resistors 328, 329 | 56K |
| Capacitors 330, 332 ____mfd__ | 220 |
| Capacitor 309 ____mfd__ | .01 |
| Resistor 310 | 22K |
| Diode 312 | 1N277 |
| Resistor 314 | 20K |
| Resistor 313 | 10K |
| Resistor 334 | 5.1K |
| Capacitor 335 ____mfd__ | 40 |
| Resistor 336 | 10K |
| Resistor 337 | 15K |
| Resistor 338 | 6.8K |
| Resistor 339 | 10K |
| Resistor 340 | 10K |
| Resistor 342 ____ohms__ | 220 |
| Resistor 343 ____ohms__ | 220 |

Referring now to FIG. 10, a configuration of the step function voltage 100 is shown for a condition in which it is desired to detect flaws of 10-mil and over in the area within circle 47 of FIG. 25, flaws of 250-mil and over in the area between circles 47, 48, and flaws of 10-mil and over in the area outside of circle 48. To accomplish this, it will be seen that the first step 345 of the step function voltage 100, which is coincident with the timing pulse $T_1$, must have sufficient amplitude so that the saw-tooth voltage 304d of the flaw-indicating pulse 98d will have its peak 306d above the threshold level 308. It will be seen, however, that if a flaw only slightly less than 250-mils occurring in the area between circles 47, 48 and providing a flaw-indicating pulse as shown in dashed lines 98e is to be tolerated, no portion of its corresponding saw-tooth voltage 304e can exceed threshold 308. Thus, step 346 of step function voltage 100 coincident with timing pulse $T_2$ must have an amplitude substantially less than that of step 345 so that the saw-tooth voltage 304e of flaw-indicating pulse 98e will not exceed threshold level 308 but that the saw-tooth voltage 304f of pulse 98f indicating a 250-mil flaw will have its peak 306f above the threshold level 308. It will be seen that step 347 of step function 100 must have its amplitude higher than step 345 so that peak 306g of saw-tooth voltage 304g of flaw-indicating pulse 98g which is responsive to a 10-mil flaw in the area outside of circle 48 will exceed threshold level 308.

It will not be readily seen that the amplitudes of each step and the step configuration of the step function voltage 100 may be selectively adjusted so as to detect flaws of different predetermined sizes and characteristics in each of the areas of interest of the article being inspected. Thus, both the areas of interest and the scanning rates therefor, and the flaw sizes to be detetced in each area, are programmed to permit the apparatus to be used for the rapid inspection of different articles by means of simple adjustment.

While FIGS. 1 and 2 illustrate an arrangement in which a transparent or translucent object is inspected and in which the light source transmits light through the object, it will be readily understood that the image dissector may receive light reflected from the object as well as transmitted therethrough. It will further be seen that the sysem of the invention can be employed for inspecting odd-shaped articles (with an appropriate scanning pattern) by virtue of the provision of the mask for blanking out video responses due to configurational characteristics of the object.

While there have been described above the principles of this invention in connection with specific apparatus, it is to be clearly understood that this description is made only by way of example and not as a limitation to the scope of the invention.

What is claimed is:

1. Apparatus for detecting flaws in an object comprising: first means for illuminating and receiving an optical image of said object in which flaws are to be detected and including first deflection means for providing a time-based video signal in response to said image; a mask having contrasting areas thereon corresponding to areas of said object which will provide wanted and unwanted video signals, respectively; second means for illuminating said mask and including second deflection means for providing a time-based blanking signal in response to the areas corresponding to said unwanted video signals; scan generating means coupled to both of said deflection means for simultaneously applying identical deflection signals thereto; program means coupled to said scan generating means for providing different predetermined line scan spacing for different predetermined areas of said object and mask; and means for blanking said video signals in response to said blanking signal thereby to provide output video signals responsive to said wanted video signals only.

2. The apparatus of claim 1 wherein said first means comprises a source of light and a camera tube, and wherein said second means comprises a flying spot scanner and photo-sensitive signal generating means.

3. The apparatus of claim 1 further comprising means for detecting said output video signals to provide flaw-indicating signals and including means for providing different predetermined threshold levels for said output video signals for different predetermined areas of said object.

4. The apparatus of claim 1 further comprising selectively adjustable programming means coupled to said scan generating means for providing different predetermined spacing of the scanning lines for different predetermined areas of said object and said mask; and means for detecting said output video signals to provide flaw-indicating signals and including means coupled to said programming means for providing different predetermined threshold levels for said output video signals for said different areas of said object, respectively.

5. The apparatus of claim 1 wherein said scan generating means generates a spiral scanning pattern; and further comprising selectively adjustable programming means coupled to said scan generating means for providing different predetermined scanning line spacing for different predetermined concentric areas of said object and mask.

6. The apparatus of claim 1 wherein said programming means includes a plurality of selectively adjustable pulse generating means for respectively generating successively occurring pulses of selectively predetermined duration; and wherein said scan generating means comprises sawtooth wave form generating means coupled to said pulse generating means for generating a composite saw-tooth deflection signal having successive sections of different slope in response to said pulses thereby providing different predetermined spacing of the scanning lines for different predetermined areas of said object and mask.

7. The apparatus of claim 6 further comprising means coupled to said pulse generating means for generating a step function signal in response to said pulses; and means for detecting said output video signals to provide flaw-indicating signals including means for adding said output video signals to said step function signal to provide a composite output signal, and means for detecting those portions of said compsite output signal which exceed a predetermined threshold level.

8. The apparatus of claim 1 wherein said scan generator means comprises selectively adjustable means for generating a composite deflection amplitude signal having successive sections of different predetermined slope thereby to provide different predetermined scanning amplitudes for different predetermined areas of said object and mask, means for generating a symmetrical recurrent signal having a predetermined frequency, means for modulating the amplitude of said recurrent signal with said deflection amplitude signal, filter means coupled to said modulating means and tuned to the frequency of said recurrent signal and phase shifting means coupled to said filter means for providing deflection signals for said first and second means thereof to provide spiral scanning.

9. Apparatus for detecting flaws in an object comprising: camera tube means for receiving an optical image of said object and including first deflection means for providing a time-based video signal in response to said image; a mask having contrasting areas thereon corresponding respectively to areas of said object which will provide unwanted and wanted video signals; flying spot scanner means having second deflection means for scanning a spot of light over said mask; photo-sensitive means exposed to said mask and receiving light therefrom for providing a time-based blanking signal in response to scanning of said spot over areas of said mask corresponding to unwanted signal areas of said object; selectively adjustable timing means for generating a succession of timing signals of predetermined duration; function generating means coupled to said timing means and to said deflection means of said camera tube means and flying spot scanner means for generating a deflection signal having successive portions respectively responsive to said timing signals thereby providing different predetermined scanning line spacing for different predetermined areas of said object and mask; blanking gate means coupled to said camera tube means and to said photosensitive means for blanking said video signal in response to said blanking signal thereby to provide output video signals responsive to said wanted video signals only; means coupled to said blanking gate means and to said timing means for respectively providing predetermined different threshold levels during said timing signals; and means for providing flaw-indicating signals responsive to said output video signals exceeding said threshold levels.

10. The apparatus of claim 9 further comprising means for generating another timing signal having a duration coextensive with all of said first-named timing signals, said other timing signal generating means being coupled to said function generating means for terminating said deflection signal.

11. The apparatus of claim 10 further comprising means for initiating a flaw-indicating pulse in response to a said flaw-indicating signal, said other timing signal generating means being coupled to said means for initiating a flaw-indicating pulse for terminating said flaw-indicating pulse in response to termination of said other timing signal, and means for generating an output pulse of fixed duration in response to termination of said flaw-indicating pulse.

12. The apparatus of claim 10 wherein said first-named timing signal generating means comprises a chain of monostable pulse generators for generating said successive timing signals in response to a trigger signal, wherein said other timing signal generating means comprises bistable pulse generating means for initiating said other timing signal in response to said trigger signal and terminating the same in response to termination of the last one of said successive timing signals, and wherein said function generating means include saw tooth wave form generating means respectively coupled to said pulse generators for generating a composite saw tooth wave form deflection signal with successive portions thereof having slopes inversely proportional to the durations of said successive timing signals.

13. The apparatus of claim 9 further comprising means coupled to said timing signal generating means for generating a step-function signal in response to said timing signals; wherein said means for providing threshold levels comprises means coupled to said blanking gate means and to said step-function signal generating means for superimposing said output video signals on said step-function signal, and means for providing flaw size-indicating signals respectively having amplitudes proportional to the duration of said superimposed output video signals; and wherein said means for providing flaw-indicating signals comprises means for detecting the portions of said flaw-size indicating signals which exceed a predetermined level.

14. The apparatus of claim 13 further comprising means for generating another timing signal having a duration coextensive with all of said first-named timing signals; bistable pulse generating means coupled to said detecting means for initiating a flaw-indicating pulse in response to a said flaw-indicating signal, said other timing signal generating means being coupled to said bistable pulse generating means for terminating said flaw-indicating pulse in response to termination of said other timing signal; and monostable pulse generating means coupled to said bistable pulse generating means for generating an output pulse of fixed duration in response to termination of said flaw-indicating pulse.

15. Apparatus for detecting flaws of predetermined size in predetermined different areas of an object comprising: an image dissector tube for receiving an optical image of said object and including first deflection means for providing a time based video signal in response to said image; a mask having transparent and opaque areas thereon corresponding respectively to areas of no interest on said object which will provide unwanted video signals and areas of interest thereon which will provide wanted video signals; a flying spot scanner having second deflection means for scanning a spot of light over said mask; photo-sensitive means disposed to receive light from said flying spot scaner which passes through the transparent areas of said mask for generating a time-based blanking signal in response thereto; a plurality of selectively adjustable timing means for generating a succession of timing signals of selectively predetermined duration; deflection voltage generating means including saw tooth wave form generating means respectively coupled to each of said timing means for generating a composite saw tooth wave form signal having successive portions respectively corresponding to said successive timing signals, said saw tooth wave form portions respectively having slopes inversely proportional to the durations of said timing signals; means for resolving said composite signal into sine and cosine functions and for applying the same to both said first and second deflection means thereof to provide simultaneous spiral scanning of said object and mask by said image dissector tube and flying spot scanner at predetermined different line scan spacing for different predetermined areas thereof; blanking gate means coupled to said image dissector means and to said photosensitive means for blanking said video signal in response to said blanking signal thereby to provide output video signals in response to said wanted signals only; and selectively adjustable means coupled to said blanking gate means and to said timing means for detecting the output video signals which exceed selectively predetermined durations occurring during each of said timing signals.

16. The apparatus of claim 15 wherein said detecting means comprises means for providing flaw-indicating signals having amplitudes responsive respectively to the durations of said output video signals, and selectively adjustable means for detecting the flaw-detecting signals which exceed selectively predetermined threshold levels during each of said timing signals.

17. The apparatuses of claim 15 further comprising function generating means coupled to said timing means for providing a step function signal in response to said timing signals; and wherein said detecting means comprises means coupled to said blanking gate means and to said function generating means for superimposing said output video signals on said step function signal whereby said step function signal forms a pedestal for said output video signals, means coupled to said superimposing means for generating saw tooth voltages in response to said superimposed video pulses respectively having amplitudes responsive to the duration of said video signals and the level of said step function signal at the time of the respective output video signal, and means for detecting the saw tooth voltages which exceed a predetermined threshold level.

18. The apparatus of claim 17 further comprising means coupled to said saw tooth voltage detecting means for initiating a flaw-indicating pulse in response to a said detected saw tooth voltage, means coupled to said flaw-indicating pulse initiating means and to said timing means for terminating a said flaw-indicating pulse in response to termination of said succession of timing signals.

19. The apparatus of claim 18 further comprising means coupled to said flaw-indicating pulse initiating means for generating an output pulse of fixed duration in response to a said flaw-indicating pulse.

References Cited

UNITED STATES PATENTS

| | | |
|---|---|---|
| 2,648,723 | 8/1953 | Goldsmith. |
| 2,679,636 | 5/1954 | Hillyer. |
| 3,026,415 | 3/1962 | Lake. |
| 2,730,565 | 1/1956 | Owens _____ 178—6 |

FOREIGN PATENTS 743,402  1/1956  Great Britain.

ROBERT L. GRIFFIN, *Primary Examiner.*

JOHN W. CALDWELL, DAVID G. REDINBAUGH,
*Examiners.*

J. A. ORSINO, P. SPERBER, *Assistant Examiners.*